United States Patent
Raju et al.

(10) Patent No.: US 9,179,473 B2
(45) Date of Patent: Nov. 3, 2015

(54) RECEIVING AND PROCESSING PROTOCOL DATA UNITS

(75) Inventors: Kartik Raju, Sunnyvale, CA (US); Mehmet Un, Santa Clara, CA (US)

(73) Assignee: Fujitsu Semiconductor Limited, Yokohama-shi (JP)

( * ) Notice: Subject to any disclaimer, the term of this patent is extended or adjusted under 35 U.S.C. 154(b) by 2220 days.

(21) Appl. No.: 12/127,600

(22) Filed: May 27, 2008

(65) Prior Publication Data

US 2009/0298508 A1    Dec. 3, 2009

(51) Int. Cl.
*H04W 72/12* (2009.01)
*H04W 88/08* (2009.01)

(52) U.S. Cl.
CPC .......... *H04W 72/1263* (2013.01); *H04W 88/08* (2013.01)

(58) Field of Classification Search
CPC .......................... H04W 72/1263; H04W 88/08
USPC ........................................ 370/328, 392, 349
See application file for complete search history.

(56) References Cited

U.S. PATENT DOCUMENTS

| | | | | |
|---|---|---|---|---|
| 6,654,811 | B1* | 11/2003 | Chaskar et al. | 709/236 |
| 7,136,396 | B2* | 11/2006 | Francoeur et al. | 370/473 |
| 7,283,508 | B2* | 10/2007 | Choi et al. | 370/341 |
| 7,389,462 | B1* | 6/2008 | Wang et al. | 714/748 |
| 7,539,750 | B1* | 5/2009 | Parker et al. | 709/224 |
| 7,653,087 | B2* | 1/2010 | Un et al. | 370/469 |
| 7,656,796 | B1* | 2/2010 | Ciavattone | 370/230 |
| 7,746,861 | B2* | 6/2010 | Nishibayashi et al. | 370/392 |
| 2006/0083233 | A1* | 4/2006 | Nishibayashi et al. | 370/389 |
| 2009/0238124 | A1* | 9/2009 | Pragada et al. | 370/329 |
| 2009/0296683 | A1 | 12/2009 | Raju | |
| 2009/0300328 | A1 | 12/2009 | Raju | |
| 2009/0323584 | A1 | 12/2009 | Raju | |
| 2009/0323585 | A1 | 12/2009 | Raju | |
| 2009/0327716 | A1 | 12/2009 | Raju | |

* cited by examiner

*Primary Examiner* — Mohammad Anwar
(74) *Attorney, Agent, or Firm* — Baker Botts L.L.P.

(57) ABSTRACT

A method for processing one or more bursts including receiving at least a portion of a first burst comprising one or more protocol data units. The method includes receiving a sequence number for the first burst. The method includes writing the sequence number and the first burst to a physical-layer queue, such that the first burst is concatenated to the sequence number in the physical-layer queue. The sequence number may identify the first burst from one or more second bursts written to the physical-layer queue preceding or following the first burst.

12 Claims, 11 Drawing Sheets

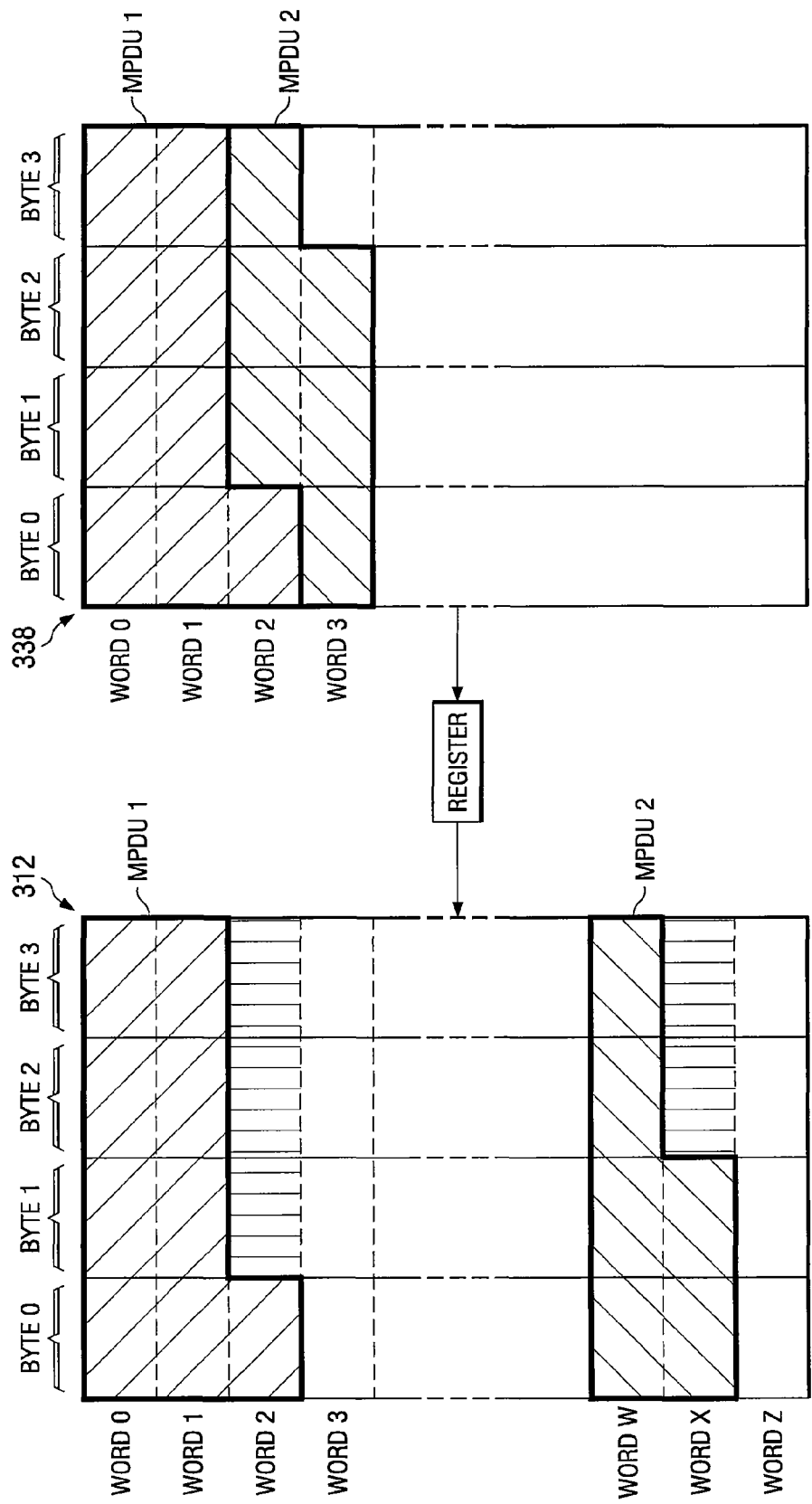

RECEIVING AND PROCESSING PROTOCOL DATA UNITS

TECHNICAL FIELD

This disclosure relates in general to communication systems and more particularly to receiving and processing protocol data units.

BACKGROUND

High speed wireless services, such as WiMAX, are becoming more widespread and may be necessary for mobile subscribers to utilize some communication services, such as streaming video. A base station may provide high speed wireless service to multiple mobile subscribers. Thus, a base station may be required to process multiple data units for reception and transmission. As a result, the ability to provide an apparatus and a method for efficiently processing multiple data units for transmission and reception in a mobile network environment presents a significant challenge to system designers and network operators.

SUMMARY

A method for processing one or more bursts including receiving at least a portion of a first burst comprising one or more protocol data units. The method includes receiving a sequence number for the first burst. The method includes writing the sequence number and the first burst to a physical-layer queue, such that the first burst is concatenated to the sequence number in the physical-layer queue. The sequence number may identify the first burst from one or more second bursts written to the physical-layer queue preceding or following the first burst.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 13B is a simplified block diagram illustrating an example operation of the MPC receiving an MPDU from a reception PHY queue and aligning the MPDU in system memory in accordance with a particular embodiment;

DETAILED DESCRIPTION

Figure 1:
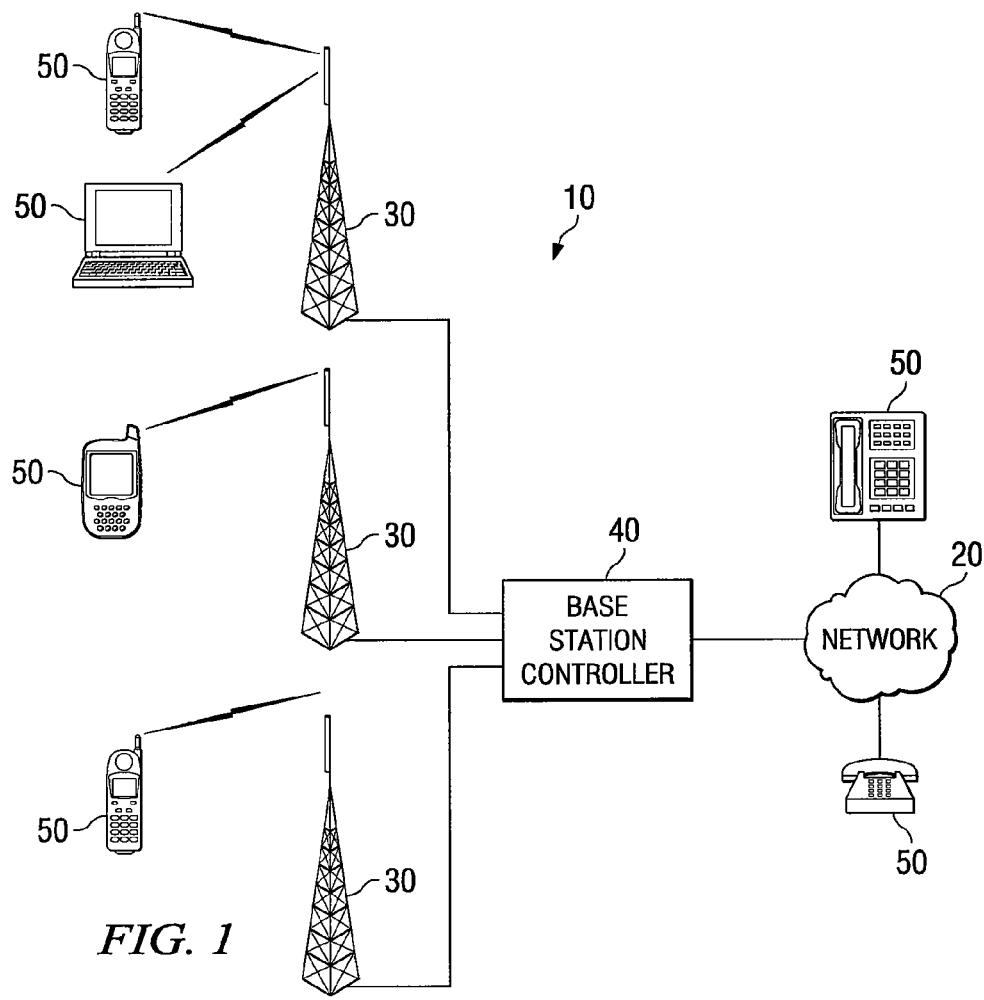
FIG. 1 is a simplified block diagram illustrating an example mobile wireless environment according to a particular embodiment.

FIG. 1 is a simplified block diagram illustrating an example mobile wireless environment according to a particular embodiment. As illustrated, mobile wireless environment 10 includes a network 20, a plurality of base stations 30, a base station controller 40, and multiple user devices 50.

In one particular embodiment, portions of mobile wireless environment 10, such as base station controllers 40, base stations 30, and user devices 50, may generally be configured or arranged to implement a wireless network, such as Worldwide Interoperability for Microwave Access (WiMAX) network based on the IEEE 802.16-2004 standard. In a more particular embodiment, mobile wireless environment 10 may utilize mobile WiMAX technology based on the 802.16e-2005 amendment to the IEEE 802.16-2004 standard. It should be noted, that any of the IEEE 802.16 family of standards, including the 802.16e-2005 amendment will be referred to in this disclosure as WiMAX. Reference to WiMAX is provided for example purposes only and mobile wireless environment 10 may alternatively utilize any communication technology capable of providing mobile or fixed wireless broadband services. For example, mobile wireless environment 10 may utilize any suitable wireless communication technologies, such as code division multiple access (CDMA), CDMA2000, GSM, general packet radio service (GPRS), EDGE, universal mobile telecommunications system (UMTS), evolution-data optimized (EV-DO), IEEE 802.11 (Wi-Fi), or any combination of the preceding.

Communications within mobile wireless environment 10 may employ any suitable communication protocol. In particular embodiments, mobile wireless environment 10 may utilize communication protocols that allow for the addressing or identification of endpoints, nodes, and/or other components coupled to a communication network such as, for example network 20. For example, using Internet protocol (IP), each of the components coupled together within mobile wireless environment 10 may be identified using IP addresses. In this manner, mobile wireless environment 10 may support any form and/or combination of point-to-point, multicast, unicast, or other techniques for exchanging data packets. Since IP networks share a common method of transmitting data, telecommunication signals may be transmitted between devices located on different, but interconnected, IP networks via network 20. In addition to being coupled to other IP networks, components of mobile wireless environment 10 may also be coupled to non-IP telecommunication networks, for example through the use of any suitable interface and/or gateway.

Network 20 represents communication equipment, including hardware and any appropriate controlling logic, for interconnecting elements coupled to network 20. In particular, network 20 may enable the communication of audio and/or video telecommunication signals, data, and/or messages, including signals, data, or messages transmitted through text chat, instant messaging, and email (all collectively referred to herein as "data"). Network 20 may comprise all, or a portion of, a radio access network (RAN), a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate certain communication capabilities, network 20 may include any combination of gateways, routers, hubs, switches, access points, and any other hardware, software, or any combination of the preceding that may implement any suitable protocol or communication. While the illustrated embodiment indicates that mobile wireless environment 10 includes a single network 20, mobile wireless environment 10 may include any number or arrangement of networks 20.

Base stations 30 represent equipment that supports wireless communications between user devices 50 and other elements of mobile wireless environment 10. Base stations 30 may generally include any number and configuration of devices and components operable to transmit and receive wireless radio signals. Such devices and components may include radio towers, antennas, signal processors, signal amplifiers and other suitable equipment for signal management. Base stations 30 may also include encryption and decryption elements for processing communications between components of mobile wireless environment 10. Certain components of an example base station 30 and their operation are described in greater detail below.

In operation, each base station 30 may handle or otherwise manage communication sessions within one or more cells of a wireless communication network. Among other things, each base station 30 may communicatively couple a user device 50 located within a serviced cell of a wireless network to one or more elements through a communication link established and maintained using any suitable wireless or mobile communication protocol. Additionally, a base station 30 may connect a user device 50 to a communication network such as network 20. Through this connection, a user device 50 within mobile wireless environment 10 may communicate with a component and/or user device 50 positioned remotely from mobile wireless environment 10. While certain functionality of base stations 30 have been described, a base station 30 may be any device operable to provide wireless or mobile access to a communication network.

Base station controller 40 may operate as a management component for a cellular or mobile network such as mobile wireless environment 10. Base station controller 40 may control and manage the flow of data to and from base stations 30. Some of the responsibilities of base station controller 40 may include management of radio channels and assisting in handover scenarios. To provide the recited functionality, base station controller 40 may include any suitable number and combination of processors, memories, and other hardware. Base station controller 40 may also include software and encoded logic for execution by one or more processors.

User devices 50 may represent any suitable combination of hardware, software, and/or encoded logic to provide communication services to a user. For example, user devices 50 may include telephones; cell phones; computers running telephony, email, or other forms of messaging and/or communication software; end user devices; video monitors; cameras; personal digital assistants (PDAs); or any other communication hardware, software, and/or encoded logic that supports the communication of voice, video, text or other suitable forms of data. Although FIG. 1 illustrates a particular number and configuration of user devices 50, mobile wireless environment 10 contemplates any number or arrangement of such components to support communication of data. User devices 50 may connect to or communicate with a base station 30 and/or network 20 using any suitable telecommunication standard or protocol.

Communications between a user device 50 and a base station 30 may utilize data bursts. In cellular and other wireless communication technologies, such as, for example, IEEE 802.16e, a burst may represent the basic element by which data and other information is communicated. Preparing bursts for transmission and reception may require substantial processing which may restrict the number of communication sessions that a base station may suitably support. Accordingly, it may be desirable to reduce the required processing for transmitting and receiving bursts.

Figure 2:
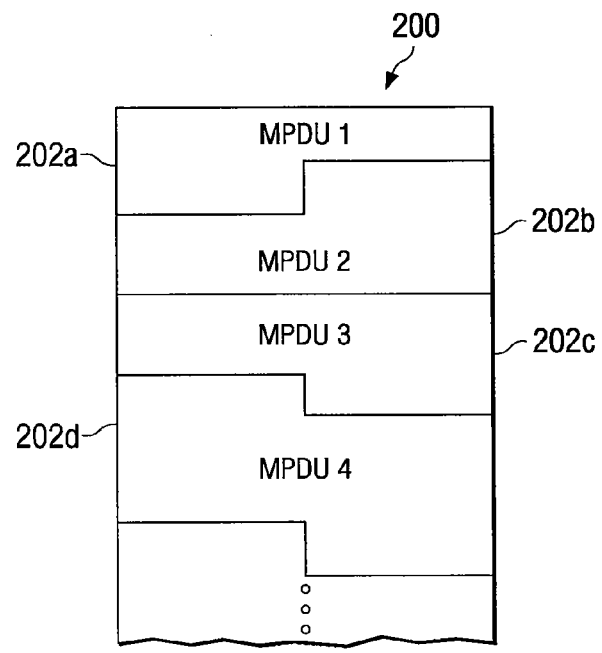
FIG. 2 is a simplified block diagram illustrating an example data burst in accordance with a particular embodiment.

FIG. 2 is a simplified block diagram illustrating an example data burst in accordance with a particular embodiment. As illustrated, burst 200 includes multiple protocol data units (PDUs) 202a-d. In general, each PDU 202a-d may represent a data frame and contain all, or a portion of, block of data associated with any packet based communication protocol. More particularly, each PDU 202a-d may represent may include data associated with one or more IP packets. In a particular embodiment, each PDU 202 may be a media access control (MAC) PDU (MPDU). Additionally, each PDU 202 may further include specific MAC processing instructions for writing and processing the data contained in the MPDU. Transmitting and/or receiving multiple PDUs 202 in a single burst may enhance the efficiency of wireless communications by permitting multiple data frames to be sent and received in a single channel access operation and thereby allow for a common acknowledgement. Although burst 200 includes a certain number of PDUs 202, a burst may contain any number of MPDUs. In one particular embodiment, a PDU 202 may be a variable length from 6 bytes to 2048 bytes.

Figure 3:
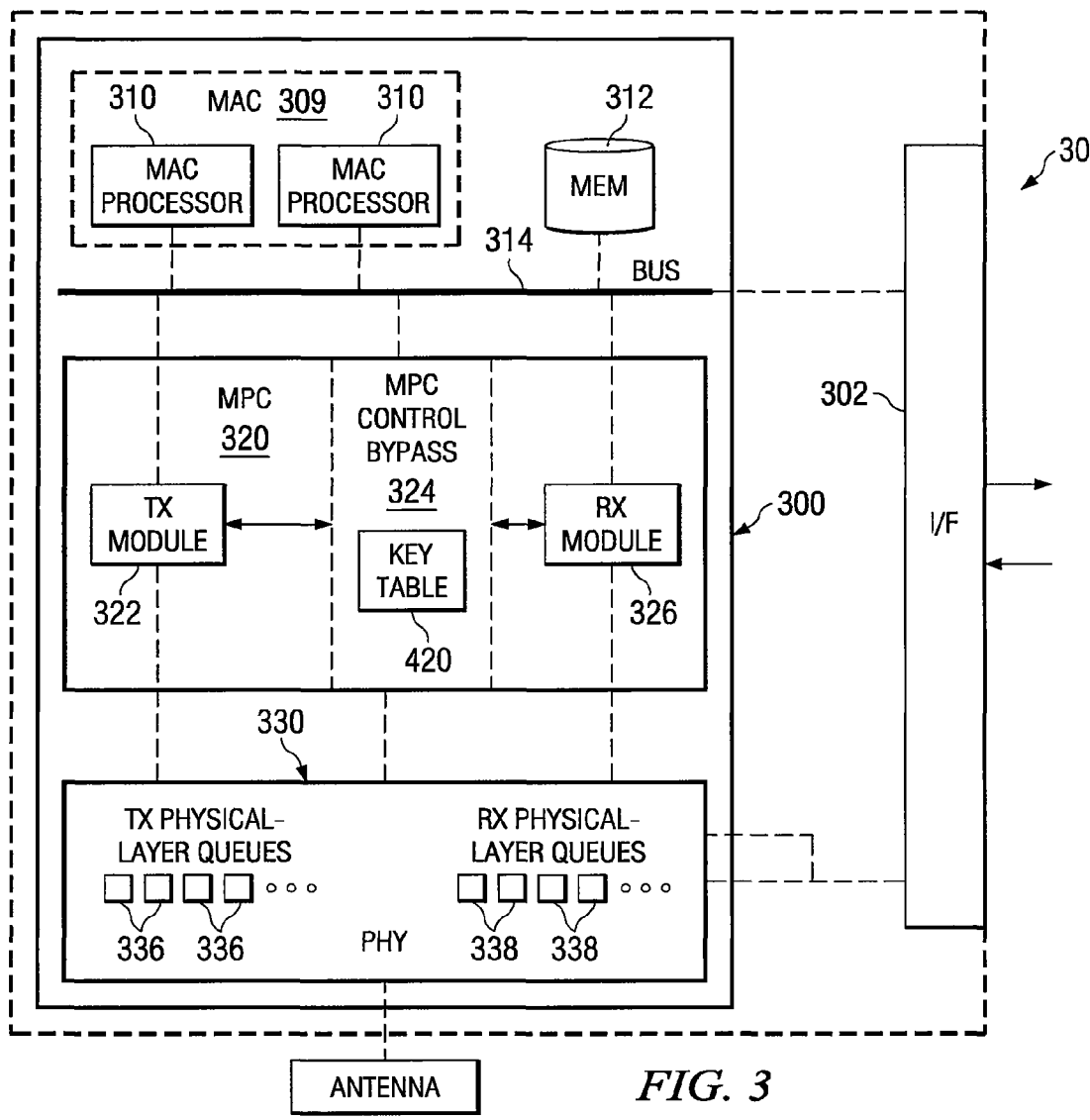
FIG. 3 is a simplified block diagram of an example base station in the mobile wireless environment of FIG. 1 in accordance with a particular embodiment.

FIG. 3 is a simplified block diagram of an example base station 30 in the mobile wireless environment of FIG. 1 in accordance with a particular embodiment. As illustrated, base station 30 includes a controller 300 and a network interface module 302. As will be described in the following disclosure, controller 300 may facilitate the efficient processing of bursts and thereby reduce the cycle time required for transmitting and receiving bursts. Accordingly, controller 300 may allow base station 30 to handle an increased number of communication sessions. It should be noted that the illustrated base station 30 may contain more or fewer components and that the described components may be combined, rearranged, or modified in any suitable manner.

Network interface module 302 facilitates communication between base station 30 and other components of mobile wireless environment 10 of FIG. 1, such as base station controller 40. In particular embodiments, network interface module 302 includes or represents one or more network interface cards (NICs) such as, for example, an Ethernet card which may facilitate the transfer of data between base station 30 and a communication network such as network 20 of FIG. 1 (for example, via base station controller 40). To support multiple simultaneous content flows, network interface module 302 may include multiple ports through which network interface module 302 can receive/transmit multiple flows simultaneously.

Controller 300 may manage one or more wireless communication sessions supported by base station 30. As will be described in greater detail, controller 300 may utilize MAC protocols to process bursts for transmission and reception. Such protocols may provide addressing and channel access control which allow base station 30 to support multiple communication sessions. Because MAC protocols and processing are well known in the art of telecommunications they will not be discussed in detail.

Controller 300 may include a MAC 309, one or more MAC processors 310, system memory 312, MAC PHY coprocessor (MPC) 320, and PHY 330. As illustrated, these components are connected by a bus 314. According to one embodiment, bus 314 represents a multilayer advanced high-performance. According to one embodiment, bus 314 represents a multilayer advanced high-performance bus. Among other things, bus 314 may serve as a conduit that facilitates the rapid transfer of data between components of controller 300. Bus 314 may also connect controller 300 to network interface module 302. This connection may facilitate the communication of data between controller 300 and a communication network, such as network 20 of FIG. 1. Additionally, in certain embodiments, bus 314 may connect controller 300 to an external processor (not illustrated). The external processor may be substantially similar to a MAC Processor 310 and provide redundancy in case of a failure of a MAC processor 310.

System memory 312 may store processor instructions, MPDU's, and/or any other appropriate information or software used by controller 300. In particular, system memory 312 may store IP packets and other data associated with one or more communication sessions supported by base station 30. System memory 312 may also store descriptors and control parameters for managing MAC processing. As will be described in greater detail, the descriptors may indicate the MAC processing needed to process data for purposes of transmission and reception.

System memory 312 may generally include any collection and arrangement of volatile or non-volatile, local or remote devices suitable for storing data. Specific examples of system memory 312 include, but are not limited to, random access memory (RAM) devices, dynamic random access memory (DRAM), read only memory (ROM) devices, magnetic storage devices, optical storage devices, flash memory, or any other suitable data storage devices. In certain embodiments, system memory 312 may be a high performance data storage device such as double data rate synchronous dynamic random access memory (DDR SDRAM) or DDR2 SDRAM.

MAC 309 is a sublayer of the data link layer that may provide addressing and channel access control mechanisms to components in FIG. 1. MAC 309 may represent an interface between MPC 320 and PHY 330. MAC processors 310 may control MAC processing for base station 30. In particular, MAC processors 310 may provide MAC protocol and control parameters needed to prepare and process bursts for transmission and reception. MAC processors 310 may represent or include any form of processing component, including dedicated microprocessors, general purpose computers, or other processing devices capable of processing electronic information. Examples of MAC processors 310 include microprocessors, digital signal processors (DSPs), application-specific integrated circuits (ASICs), field-programmable gate arrays (FPGAs), and any other suitable specific or general purpose processors. In particular embodiments processors 310 may represent customized ARM9 processors.

MAC PHY coprocessor (MPC) 320 represents a data processing unit. As illustrated, MPC 320 includes a transmission module ("TX module") 322, control bypass 324, and a reception module ("RX module") 326. Control bypass 324 represents a processing connection whereby MAC processors 310 may send transmission and reception control parameters directly to PHY 330. TX module 322 represents a processing interface that may process and write bursts for transmission. Conversely, RX module 326 is a processing interface that may process received bursts. In this manner, MPC 320 may facilitate the simultaneous processing of data for transmission and reception. The operation and components of TX module 322 and RX module 326 will be described in greater detail below.

In one particular embodiment, MPC 320 may generally manage the transfer and processing of data between system memory 312 and PHY 330. Such processing may include running a header check sequence (HCS), cyclic redundancy check (CRC), aligning an MPDU in system memory 312 or in PHY 330, and performing any relevant encryption and/or decryption, such as Advanced Encryption Standard (AES) in cipher block chaining mode (AES-CBC) or counter with CBC-MAC mode (AES-CCM). Transferring data for purposes of transmission may include writing data from system memory 312 into a MPDU which may be transmitted by PHY 330 in a burst. By contrast, transferring data for purposes of reception may include processing MPDUs in a received burst from PHY 330 and writing the MPDUs into system memory 312 in any suitable form. As will be described in greater detail below, the processing parameters used by MPC 320 may be provided by one or more MAC processors 310. MPC 320 may be operable to identify and store where a first MPDU ends and where a second MPDU begins. As will be described with respect to FIGS. 12A and 12B, MPC 320 may control alignment issues that arise when transferring MPDUs from system memory 312 to PHY 330 and vice versa.

In one particular embodiment, MPC 320 may also generally manage the transfer and processing of data between system memory 312 and network interface module 302 connected to a communication network such as network 20 of FIG. 1 (for example, via base station controller 40). Thus, MPC 320 may generally manage the transfer and processing of data to and from both network interface module 302 and PHY 330.

PHY 330 represents an interface to a transmission medium. Among other things, PHY 330 may manage the transmission and reception of data associated with a communication session based on control parameters prescribed by MAC Processors 310. PHY 330 may include or be operatively connected to a wireless transceiver and antenna or other transmission and reception device associated with base station 330. PHY may be word aligned, which may cause alignment problems for transferring MPDUs from RX PHY queues 338 to system memory 312 and for transferring MPDUs from system memory 312 to TX PHY queues 336 because MPDUs are byte aligned. A word may include four bytes, such that one word may contain bytes from two different MPDUs. Alignment is discussed in more detail in FIGS. 13A and 13B.

As illustrated in FIG. 3, PHY 330 includes a plurality of PHY queues, TX PHY queues 336 and RX PHY queues 338, respectively. In one embodiment, TX and RX PHY queues may be first in—first out queues ("FIFOs"). TX PHY queues 336 and RX PHY queues 338 represent data queues that may store one or more bursts, or portions thereof, associated with one or more communication sessions supported by base station 30.

PHY 330 may have multiple TX PHY queues 336 and RX PHY queues 338. According to a particular example embodiment, PHY 330 may include ten TX PHY queues 336 and ten RX PHY queues 338. Separating data into multiple queues for transmission and reception may enhance efficiency by allowing controller 300 to receive and/or transmit multiple bursts simultaneously. Such functionality may allow base station 30 to better support multiple communication sessions.

In operation, PHY 330 may generally control signaling and other processes related to transmitting and receiving bursts. Among other things, PHY 330 may receive control parameters from a MAC processor 310 and use the control parameters to manage the transmission and reception of bursts. Such control parameters may include an appropriate modulation scheme and/or when to transmit and/or receive data. As mentioned, to facilitate control processing, the control parameters may be passed to PHY 330 via MPC control bypass 324.

As described, one function of controller 300 is to process bursts for transmission and reception. To reduce both the number of cycles and the cycle time to process bursts, controller 300 may separate control and data processing functions. More particularly, some of the MAC processing functionality normally associated with the data link layer for network communications may be offloaded from MAC processors 310 to MPC 320. Separating MAC control from processing data may increase the efficiency of controller 300 by limiting the need to continuously write and copy data between the processing components to system memory 312. Additionally, providing a control bypass 324 may allow MAC processors 310 to write control words directly to PHY 330. Thus, among other things, controller 300 may distribute processing and control functions in a manner that increases burst processing efficiency.

To further describe the functionality provided by controller 300, the operations of transmitting and receiving a burst will be described separately. While this disclosure may distinguish between transmission and reception, it should be noted that controller 300 may perform such functions simultaneously and for multiple communication sessions.

Figure 4:
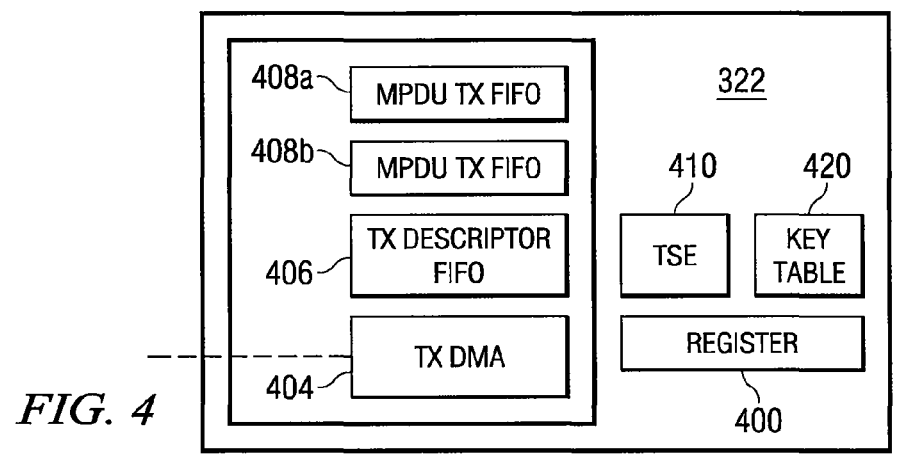
FIG. 4 is a simplified block diagram of an example transmission module of the base station of FIG. 3 in accordance with a particular embodiment.

FIG. 4 is a simplified block diagram of an example TX module 322 of the base station 30 of FIG. 3 in accordance with a particular embodiment. As discussed, TX module 322 may process and write MPDUs for transmission as a burst. In the illustrated embodiment, TX module 322 includes a register 400, a transmission streamlined engine (TSE) 410, and a key table 420. It should be noted that in certain embodiments key table 420 may represent a component of MPC control bypass 324 illustrated in FIG. 3.

Register 400 may serve as a memory cache for transmission module 322. As illustrated, TX module 322 includes a transmission direct memory access (DMA) 404, descriptor FIFO 406, and a plurality of MPDU TX FIFOs 408. TX DMA 404 may facilitate the transfer of data from system memory 312 to TX module 322. Transmission descriptor FIFO 406 represents a data queue that may store transmission descriptors generated by a MAC processor 310. As will be described with respect to FIG. 6, a transmission descriptor may include information for processing and writing data stored in system memory 312 into a MPDU. While a transmission descriptor FIFO 406 may be of varying size, in a particular embodiment, transmission descriptor FIFO 402 contains 16 entries. MPDU TX FIFOs 408 represent data queues that may store MPDUs and other data pulled from system memory 312 by TX DMA 404.

TSE 410 represents the processing unit of TX module 322. In general, TSE 404 may perform all of the described processing functionality for writing a MPDU such as, for example, a HCS, AES-CCM mode encryption, AES-CBC mode encryption, and a CRC. For AES-CCM and AES-CBC operations, TSE 410 may have access to key table 420 which may store encryption keys for encrypting MPDUs. In one embodiment, key table 420 may be accessed by TX module 322 and RX module 326.

Figure 5:
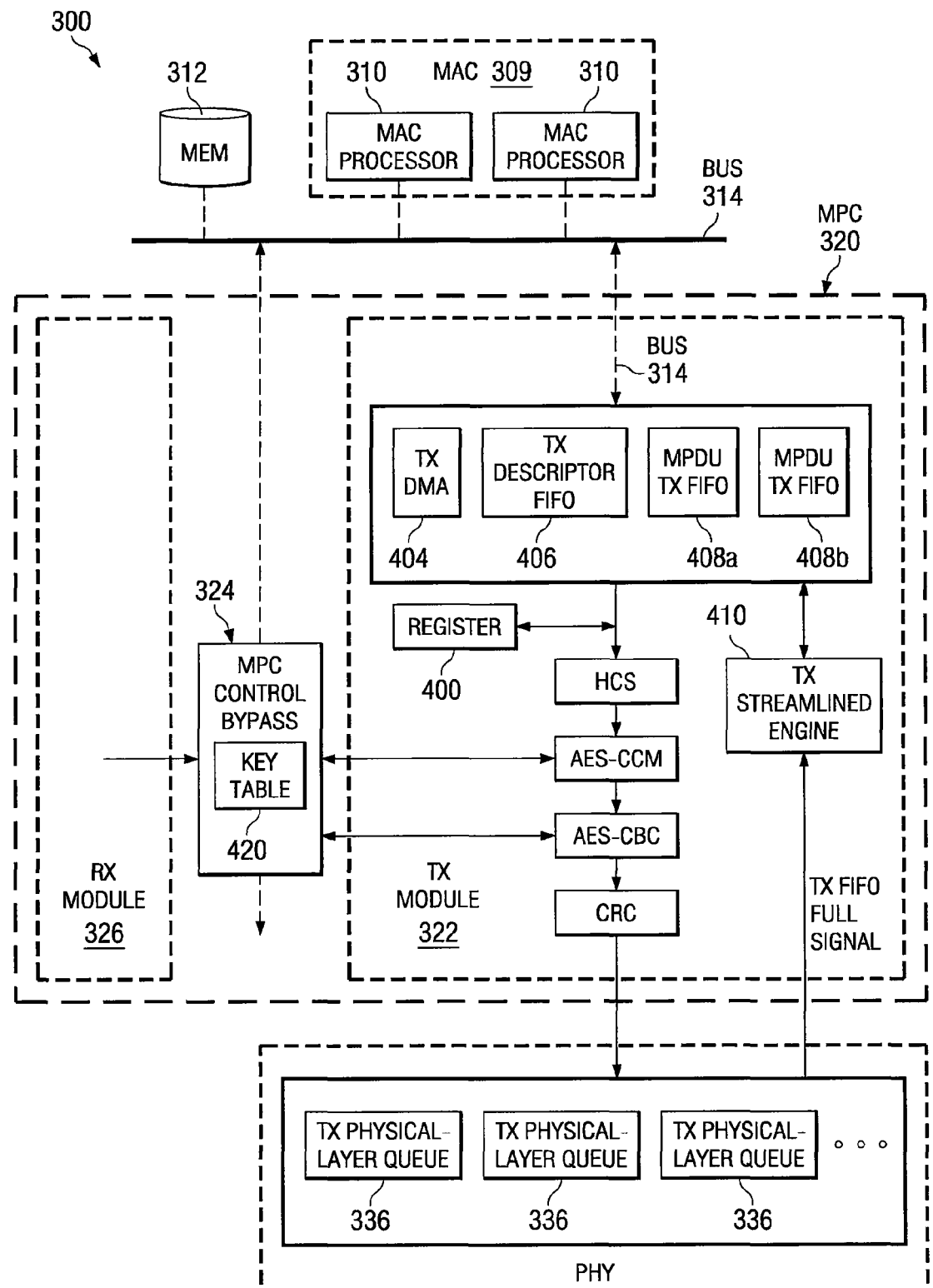
FIG. 5 is a simplified block diagram illustrating certain components from FIG. 3 and an example operation of a controller during a burst transmission process in accordance with a particular embodiment.

FIG. 5 is a simplified block diagram illustrating certain components from FIG. 3 and an example operation of a controller 300 during a burst transmission process in accordance with a particular embodiment. Because FIG. 5 is intended to illustrate the interactions of components of a controller 300 involved in processing a burst for transmission, it should be noted that certain components relating to reception processing may not be illustrated. Additionally, in certain embodiments, the illustrated components may be combined, rearranged, or modified in any suitable form, manner, or arrangement.

For purposes of understanding the transmission operation of controller 300, assume that a burst is to be generated based on data contained in one or more Ethernet packets. The Ethernet packets may be received by controller 300 through, for an example, an Ethernet connection, and stored in system memory 312. At the outset, MAC processor 310 may parse the header(s) of one or more Ethernet packets that are to form a MPDU. Based on the header(s) MAC processor 310 may write a transmission descriptor. Upon writing the transmission descriptor, MAC processor 310 may send the transmission descriptor to transmission descriptor FIFO 406 of TX module 322.

Once a transmission descriptor is written, or if there are any transmission descriptors in transmission descriptor FIFO 406, TSE 410 may initiate the process of writing a MPDU. This process may begin with TSE 410 signaling TX DMA 404 to pull data comprising the MPDU from system memory 312 and storing it in a TX MPDU FIFO 408. Provided that the assigned TX PHY queue 336 is not full, TSE 410 may start processing the MPDU data from the TX MPDU FIFO 408 based on the transmission descriptor. Such processing may include running a HCS, AES-CCM mode, AES-CBC mode, and/or CRC engine. If either of the MPDU TX FIFOs 408 is empty, TSE 410 may initiate TX DMA 404 to retrieve data comprising the next MPDU from system memory 312 while the current MPDU is being processed.

Once processed, the MPDU may be written to an assigned TX PHY queue 336. The assignment of TX PHY queues 336 may be based on the burst with which a MPDU is associated. According to one embodiment, all MPDUs associated with a particular burst may be assigned to the same TX PHY queue. As will be described below, the assignment may be performed by a MAC processor 310 and may the assignment be designated in the transmission descriptor associated with the MPDU. In an embodiment, TX module 322 may thus determine the appropriate TX PHY queue 336 to write a MPDU by reading the transmission descriptor associated with the MPDU to determine the MPDU's associated burst. After writing a MPDU to a particular TX PHY queue 336, TX module 322 may create a pointer to the MPDU. The pointer may be used when writing subsequent MPDUs associated with the same burst to the designated TX PHY queue 336. Specifically, the pointer may indicate the end of a MPDU that was previously written to the designated TX PHY queue 336 so that TX module 322 may write and concatenate subsequent MPDUs associated with the same burst. The pointers may facilitate simultaneous processing of multiple bursts by allowing TX module 322 to prepare and write a MPDU for a first burst and then prepare and write a MPDU for a second burst before returning to preparing and writing subsequent MPDUs for the first burst.

TX module 322 may continue the described writing process until all of the MPDUs for a burst are written to the designated TX PHY queue 336. Once a designated number of the MPDUs forming a burst are written, MAC processors 310 may generate control parameters for transmitting the burst. As discussed, the control parameters may indicate an appropriate modulation scheme, and/or timing parameters for transmitting the burst. Once prepared, the control parameters may be sent to PHY 330 via control bypass 324. PHY 330 may use the control parameters to manage the transmission of the burst.

In a particular embodiment, MAC processors may assign and/or schedule MPDUs to TX PHY queues so that MPDUs for multiple bursts may be processed simultaneously. In particular, MAC processors 310 may schedule the MPDUs in random order for different TX FIFOs. For example, if a particular TX PHY queue 336a has ten MPDUs in the burst that it is processing and a particular TX PHY queue 336b has three MPDUs in the burst that it is processing, then the MAC processors 310 may schedule five transmission descriptors for TX PHY queue 336a, then schedule three transmission descriptors for TX PHY queue 336b, and then return to scheduling transmission descriptors for the TX PHY queue 336a. When MPC 320 returns to processing MPDUs for TX PHY queue 336a, it may determine whether to concatenate the subsequent MPDU to the last MPDU that was written to the TX PHY queue 336a by determining whether the MPDU is part of the same burst. Thus, MPC 320 need not process all the MPDUs for a given burst in order. Such functionality may provide flexibility for scheduling concurrent bursts.

Figure 6:
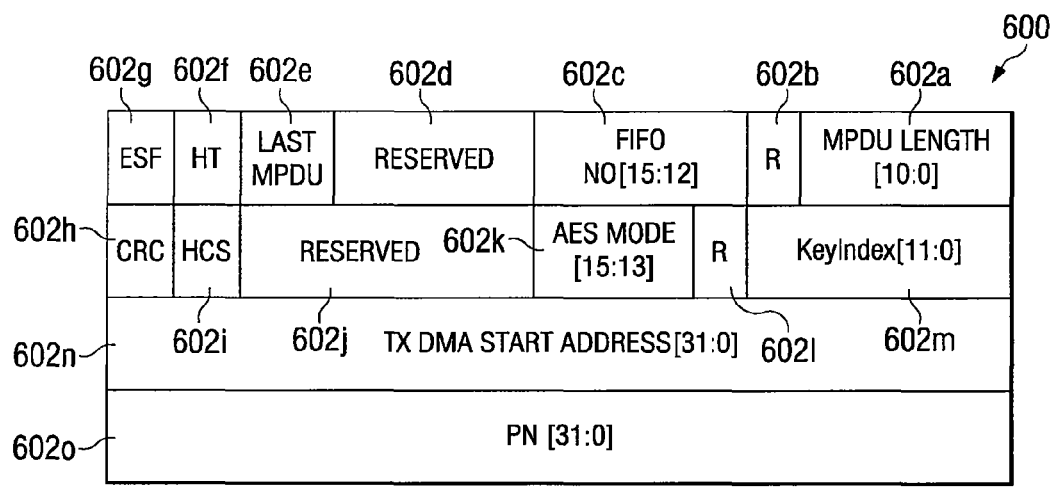
FIG. 6 is a simplified block diagram of an example transmission media access control (MAC) protocol data unit (MPDU) descriptor in accordance with a particular embodiment.

FIG. 6 is a simplified block diagram of an example transmission (TX) MPDU descriptor 600 in accordance with a particular embodiment. In the illustrated embodiment, TX MPDU descriptor 600 has various descriptor fields 602 that specify information for processing and writing a MPDU. Descriptor field 602a specifies the MPDU length in bytes and may also include a MPDU header as well as any CRC and extended subheaders. Descriptor field 602c specifies the TX FIFO number to which the burst is to be written. Descriptor field 602e specifies whether the MPDU is the last MPDU in the burst. Descriptor field 602f may indicate whether the MPDU header is a signaling header or a generic MAC header. Descriptor field 602g may indicate whether the MPDU is to have an extended subheader. Descriptor field 602h indicates whether a CRC is to be performed. Descriptor field 602i specifies whether HCS is enabled. Descriptor field 602k specifies an AES mode for the MPDU. The AES mode may indicate what type of encryption/decryption is necessary for processing the MPDU for transmission as a burst. Such encryption and/or decryption modes may include, for example, AES-CCM encryption, Dot16KDF, a CMAC uplink, a CMAC downlink, plain AES encryption, plain AES decryption, AES-CBC encryption, AES-CBC decryption or no encryption. Descriptor field 602m specifies a key index number which indicates the key to be used from key table. Descriptor field 602n provides the TX DMA start address which may be a byte address that provides the location of the MPDU data in system memory 312. Descriptor field 602o specifies a psuedo-random number (PN) which may be used for AES-CCM encryption. As illustrated descriptor fields 602b, 602d, 602j, and 602l represent reserved byte sequences. While specific fields 602 for a descriptor 600 have been provided, descriptor 600 may have any number of fields 602. Additionally, fields 602 may be rearranged and interleaved to reserve bits for additional fields 602.

As mentioned, MAC processors may prepare a descriptor 600 by reading/parsing the header(s) of one or more packets. By reading the header(s), MAC processors may prepare the descriptor 600 without having to decrypt and/or encrypt the payload of a packet. Additionally, through parsing the headers, MAC processors 310 may determine the relevant identifiers and pointers which may be used by TX DMA 404 in preparing the MPDU. In particular, descriptor fields 602a and 602n may generally be used by TX DMA 404 to pull the relevant data that is to be included in the MPDU payload. Because descriptor field 602n indicates a pointer for the start of the MPDU, and descriptor field 602a indicates the length of the MPDU, TX DMA may generally begin pulling MPDU data from system memory 312 beginning at the start address and continuing until all the MPDU byte length is reached.

In certain situations, descriptor field 602n may point TX DMA to a TX DMA descriptor stored in memory 312. As previously discussed, a MPDU may comprise multiple IP packets, each of which may occupy non-contiguous locations in system memory 312. Accordingly, TX DMA 404 may have to perform multiple individual searches and make multiple requests to pull the relevant data from system memory 312. To make this process more efficient, the various packets may be chained together in system memory 312 using TX DMA descriptors. As will be described, the TX DMA descriptors may, among other things, specify both the order and location of specific data units forming a MPDU.

Figure 7:
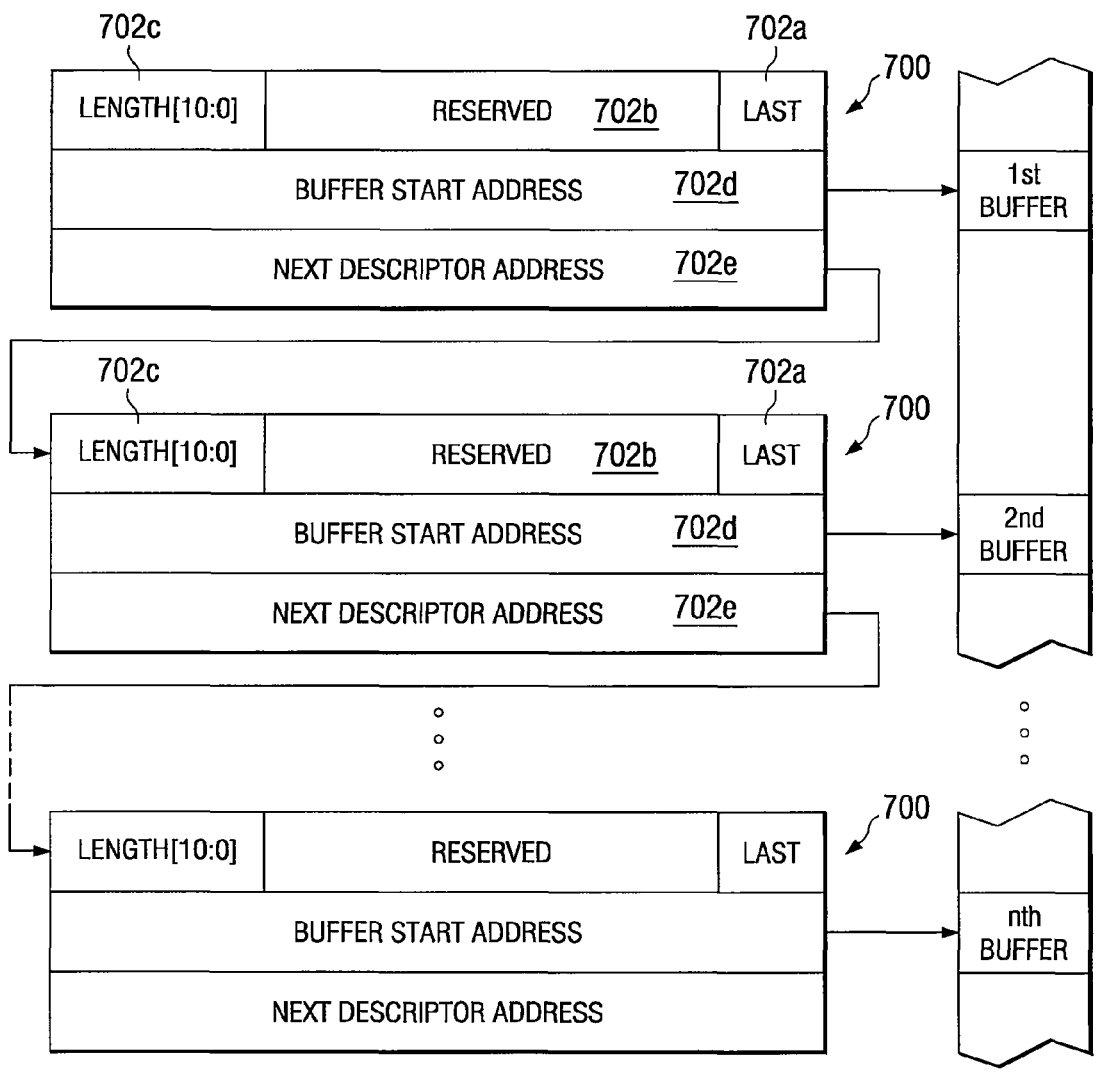
FIG. 7 is a simplified block diagram of an example transmission direct memory access (DMA) descriptor in accordance with a particular embodiment.

FIG. 7 is a simplified block diagram of an example transmission DMA descriptor 700 in accordance with a particular embodiment. The TX DMA descriptors 700 include a plurality of chaining fields 702 that provide information relating to the current data unit that is to be pulled from system memory 312 in addition to the well as the location of the subsequent data unit in the MPDU. As illustrated, chaining field 702a specifies the location of the preceding data unit or IP packet in the MPDU. Accordingly, chaining field 702a may be used to properly order the data units in the MPDU. Chaining field 702b represents a reserved field and may contain overflow data that does not fit within one or more of the other chaining fields 702. Chaining field 702c indicates the length of the current data unit. Chaining field 702d specifies a buffer start address for a buffer that may be used to ensure byte alignment of the data units that are being chained. Chaining field 702e indicates the address of the next TX DMA descriptor 700.

According to one mode of operation, TX DMA 404 may use chaining fields 702 of TX DMA descriptors 700 to concatenate, or chain, non-contiguous data units. For instance, assume that descriptor field 602n of a given transmission descriptor 600 includes a pointer to a TX DMA descriptor 700 stored in system memory 312. TX DMA 404 may go to the location in system memory 312 indicated by the pointer, read the TX DMA descriptor 700, and pull the entire data unit using chaining field 602c which provides the length of the data unit. Once TX DMA 404 has pulled the data associated with a given TX DMA descriptor 700, chaining field 702e may point TX DMA 404 to the location in system memory 312 where the next data unit in the MPDU is stored. TX DMA 404 may then repeat the described process until all the data associated with a MPDU is transferred from system memory 312 to the appropriate MPDU TX FIFO 408. Thus, chaining TX DMA descriptors may allow TX module 322 to seamlessly prepare and process MPDUs having non-contiguous data units.

A similar chaining process may also be employed for purposes of generating a CMAC downlink message. A CMAC downlink message may be a management message that contains a message authentication code key used to validate the authenticity of the MAC management message. In certain situations, the MAC management message may be spread across multiple MPDUs. In such instances, MPC 220 may chain multiple MPDUs and calculate the CMAC on a MPDU by MPDU basis. In this scenario, length information for the first MPDU may be provided by chaining field 702c of a TX DMA descriptor 700. TX DMA 404 may then bring in the first MPDU to the TX FIFO 408 and TSE 410 may calculate the CMAC. If the last bit chaining field 702a is not set, then TSE 410 may continue with processing the next MPDU. If the last chaining field 702a is set, then TSE 410 will know that the current MPDU is the last MPDU in the MAC management message. At this point, TSE 410 may calculate the CMAC on the entire MAC management message across the plurality of MPDUs. In this manner, multiple MPDUs may be chained for MAC management messages.

To further illustrate the transmission capabilities of particular embodiments, the following example is provided wherein a controller 300 is sending a burst comprising ten MPDUs of arbitrary length. For purposes of this example, it is assumed that all of the data for the MPDUs is stored in system memory 312. At the outset, a MAC processor 310 may write one or more TX DMA descriptors 700 for the first MPDU. After chaining any and all scattered packets for the first MPDU, MAC processor 310 may check to see if transmission descriptor FIFO 406 is empty or if there is any space available. At this point, MAC processor 310 may write the descriptor 600, including the processing parameters, for the first MPDU into descriptor FIFO 406. This described process may be repeated by MAC processor 310 for the remaining nine MPDUs.

While the descriptors 600 for the remaining nine MPDUs are generated, TSE 410 may read the first descriptor 600 and initiate TX DMA 404 to bring the entire first MPDU from system memory 312 to the first MPDU FIFO 408a. At this point, TSE 410 may check to see if the TX FIFO 336 to which the MPDU is to be written is full. If there is available space in the designated TX FIFO 336, then TSE 410 may begin processing the MPDU data according to the descriptor 600. While the first MPDU is written to the TX FIFO 336, TSE 410 may simultaneously read the next descriptor 600 from descriptor FIFO 406 and initiate TX DMA 404 to pull the next MPDU from system memory 312 and write the next MPDU to the second MPDU FIFO 408b. Once processing for the first MPDU is complete, TSE 410 may switch to MPDU FIFO 408b and begin processing the second MPDU. Once a designated number of MPDUs have been processed and written to the specified TX FIFO 336, a MAC processor 310 may write the control parameters for the burst to PHY 330 via control bypass 324. It should be noted that TSE 410 may concatenate MPDUs in the designated TX FIFO 336 until it encounters a MPDU descriptor with the last MPDU bit set (i.e., descriptor field 602e indicates that the MPDU is the last MPDU in the burst). At this point, TSE 410 may pad zeros to the remaining bytes and write this buffer to the TX FIFO 336. Once complete, PHY 330 may transmit the burst in accordance with the control parameters provided by the MAC processor 310.

Figure 8:
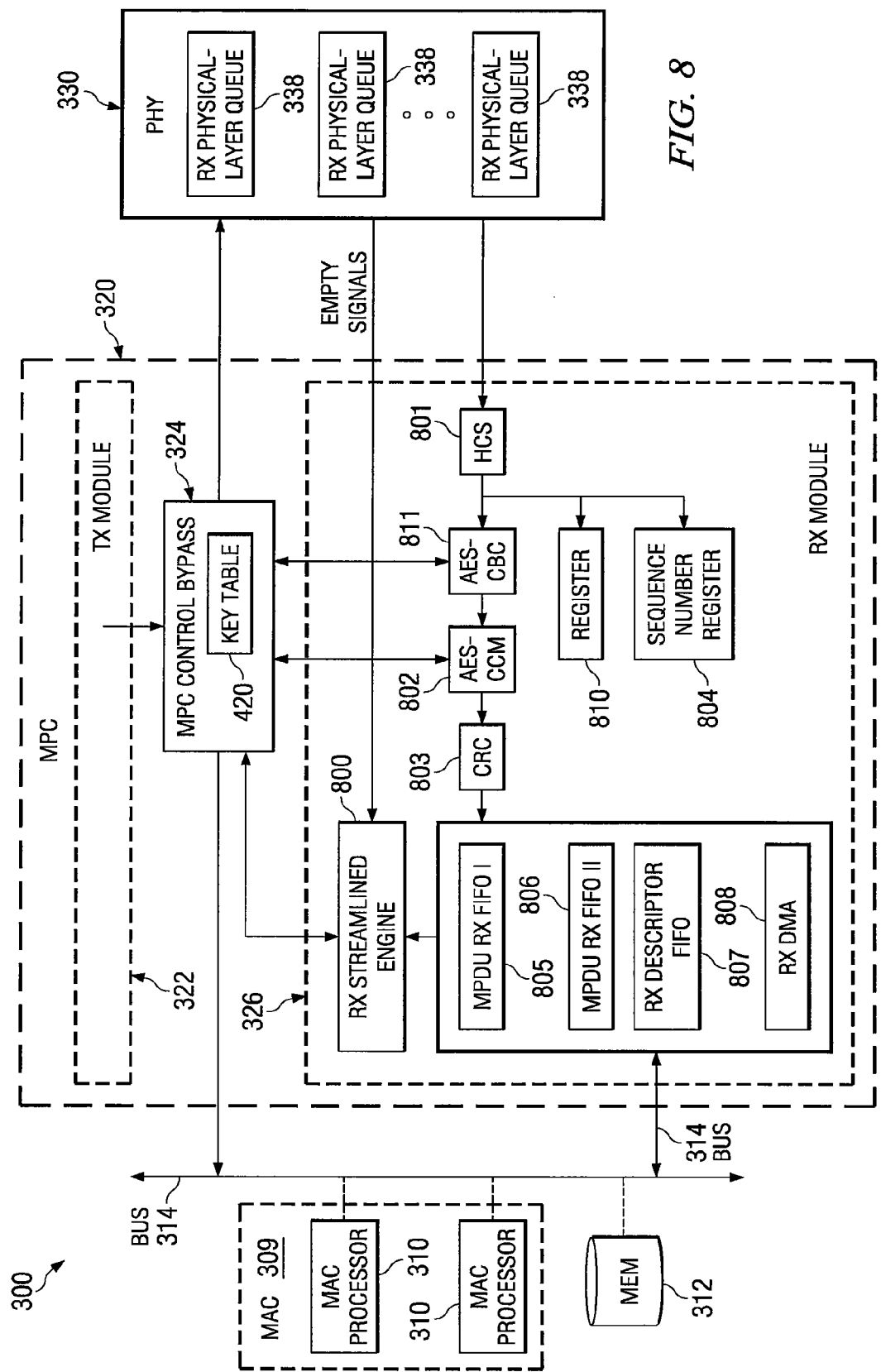
FIG. 8 is a simplified block diagram of an example reception module of the base station of FIG. 3 in accordance with a particular embodiment.

FIG. 8 is a simplified block diagram of an example reception module of the base station of FIG. 3 in accordance with a particular embodiment. An embodiment of a RX module 326 of MPC 320 is illustrated. As discussed, RX module 326 may process received bursts and its associated MPDUs from corresponding PHY RX PHY queues and write the processed MPDUs to system memory 312. In the illustrated embodiment, RX module 326 may include a reception streamlined engine (RSE) 800, HCS 801, an AES-CCM 802, a CRC 803, a sequence number register 804, an MPDU RX FIFO I 805, an MPDU RX FIFO II 806, a RX descriptor FIFO 807, an RX DMA 808, and an internal register 810, and an AES-CBC 811.

RSE 800 represents the processing unit of RX module 326. In general, RSE 800 may perform all of the processing functionality on a received MPDU such as, for example, HCS 801, AES-CCM 802, AES-CBC 811, and CRC 803. RSE 800 may also monitor the empty signals associated with RX PHY queues 338 to determine if any of the RX PHY queues include an MPDU to be processed. In one particular embodiment, RSE 800 may scan the RX PHY queues 338. A round robin algorithm may be used to scan the RX PHY queues 338 so that multiple bursts can be extracted simultaneously. For example, RSE 800 may begin to extract the header bytes from a first RX PHY queue 338. RSE 800 may process MPDU header through HCS 801 to obtain a result that indicates if MPDU header has been altered during transmission or storage of the data. If the HCS check fails, MAC processors 310 can generate an RX descriptor instructing RSE 800 to discard the current burst. RSE 800 may implement this instruction by continuing to discard bytes in the identified RX PHY queue 338 until a new sequence number is reached. If the HCS check passes, then RSE 800 may process the MPDU according to an RX descriptor provided by the MAC processor 310.

Sequence number register 804 may serve as a memory cache to store the sequence number of a burst for an associated MPDU. In one embodiment, a sequence number register 804 may be included for each associated RX PHY queue 338. For example, if controller 300 includes ten RX PHY queues 338 to receive ten concurrent bursts, then RX module 326 may include ten sequence number registers 804 that each store the sequence number of the burst of the current MPDU being processed. Each burst may need to be identified to be processed properly. For example, each burst may come from a different user device 50 so the sequence number is important for MAC processing. MAC processors 310 may control the schedule and allocate a time slot for each user device 50 for time division multiplexing, such as a CDMA application. A user who pays for better service may receive more time slots to receive data from their associated user device 50.

In one embodiment, RX module 326 may include a pair of MPDU RX FIFOs 805, 806. A FIFO may have four bytes per entry, so a pair of FIFOs may be required to store an MPDU header comprising six bytes.

RX module 326 may be fast enough to scan all ten RX PHY queues 338 before MAC processors 310 can write a RX descriptor for the header obtained from the first scanned RX PHY queue 338. MAC processors 310 may be operable to parse all the headers from sequence number generator 804 and register 810. According to one embodiment, there is a sequence number generator 804 and register 810 for each RX PHY Queue 338. MAC processors 310 may transmit the RX descriptor to RX Descriptor FIFO 807.

RX Descriptor FIFO 807 represents a data queue that may store RX descriptors generated by MAC processors 310. As described below in FIG. 9, RX descriptor may include information for processing and writing data stored in a particular RX PHY queue 338 into system memory 312. While RX descriptor FIFO 807 may be a queue of varying size, in a particular embodiment, RX descriptor FIFO 807 may contain ten entries, such that each descriptor entry is three words. RX descriptor FIFO 807 may only store ten entries because a RX descriptor may not be written until the MPDU header is made available to the MAC processors 310. As a result, there may only be ten RX descriptors available for an associated RX PHY queue 338 at any point in time because on RX descriptor may be available for the current MPDU and another RX descriptor may be available for the MPDU to be processed next.

RSE 800 may receive RX descriptor from RX Descriptor FIFO 807 for instructions to process an MPDU from a particular RX PHY queue 338. According to instructions in RX descriptor, RSE 800 may process a particular MPDU from a particular RX PHY queue 338. According to the instructions in RX descriptor, RSE 800 may process the MPDU using AES-CCM 802 or AES-CBC 811, which are modes of operation for cryptographic block ciphers defined for use with AES. AES-CCM 802 and AES-CBC 811 are authenticated encryption algorithms designed to provide authentication and privacy. For AES-CCM and AES-CBC operations, RSE 800 may have access to key table 420 which may store decryption keys for decrypting MPDUs. The modes of encryption/decryption that utilize key table 420 are described in more detail below in FIG. 11. According to the instructions in RX descriptor, RSE 800 may process MPDU through CRC 803, which is a checksum of the MPDU to detect alteration of data during transmission or storage of data.

RSE 800 may initiate RX DMA 808 to transfer the processed MPDU to system memory 312. RX DMA 808 allows RX module 326 to write processed MPDUs to system memory 312 independently of the processing unit. By utilizing RX DMA channel, RX module 326 can write data to system memory 312 with less processing.

While RX DMA 808 is transferring the processed MPDU to system memory 312, RSE 800 may read the next RX descriptor to be processed. Once all RX descriptors are processed, RX module may begin scanning the RX PHY queues 338 to extract the next available MPDU headers or sequence numbers from each RX PHY queue 338. RX module 326 may include one or more registers 810 that serve as a memory cache to store data for any other suitable purposes.

In an example operation of base station 30 receiving and processing one or more concurrent bursts comprising MPDUs, MAC processors 310 may program PHY 330 for receiving bursts using MPC control bypass 324. For example, if base station 30 is scheduled to receive two bursts, then MAC processors 310 may instruct PHY 330 to receive a first burst with a first set length at a first set time and a second burst with a second set length at a second set time. MAC processors 310 may determine a sequence number for each received burst and instruct PHY 330 to write an associated sequence number in RX PHY queue 338 for each new burst that PHY 330 begins to receive. Each burst in a particular RX PHY queue 338 may be delineated by a new sequence number associated with the next burst in the RX PHY queue 338.

RX module 326 monitors empty signals from the RX PHY queues 338. RX module 326 may utilize a round robin algorithm to extract the data from each RX PHY queue 338 that is not empty.

RX module 326 may extract the sequence number of a new burst from a particular RX PHY queue 338 and store this sequence number in a corresponding sequence number register 804. Sequence number registers 804 may be included in RX module 326 for each corresponding RX PHY queue 338, such that the number of sequence number registers 804 is equal to the number of RX PHY queue 338. The stored sequence number may remain the same until RX module 326 begins to extract a new burst.

RX module 326 may extract the header from the first MPDU stored in each RX PHY queue 338. In one particular embodiment, the MPDU header may be six bytes, such that RX module 326 extracts the first six bytes from the first MPDU stored in each of the RX PHY queues 338. RX module 326 may store the first four bytes of the MPDU header in register 810 and store the last two bytes of the MPDU header in a portion of sequence number register 804. RX module 326 may store the result of the HCS 801 as a bit in sequence number register 804. RX module 326 may also store the sequence number of the MPDU in sequence number register 804.

RX module 326 may submit the contents of register 810 and sequence number register 804 to MAC processors 310, such that the contents include the MPDU header, the result of the HCS, and the sequence number of the burst associated with the MPDU. If the HCS check failed, then MAC processors 310 may send a RX descriptor with instructions for the RX module 326 to discard the burst associated with the MPDU. If the HCS check passed, then MAC processors 310 may provide instructions in a RX descriptor for RX module 326 to extract the payload of the MPDU from a particular RX PHY queue 338. RX descriptor may provide further instructions for processing the MPDU payload.

MAC processors 310 may be able to write multiple descriptors at the same time. For example, if base station 30 includes ten RX PHY queues 338 that receive ten concurrent bursts, then RX module 326 may simultaneously transmit the MPDU header info, HCS result, and sequence numbers for ten different MPDUs originating from the ten RX PHY queues 338 to MAC processors 310. After receiving this data, MAC processors 310 may be able to simultaneously generate ten RX descriptors based on this data and simultaneously write the ten RX descriptors to RX module 326.

RX descriptors may be written to RX descriptor FIFO 807. RSE 800 may read an RX descriptor from RX descriptor FIFO 807. RX descriptor provides RSE 800 with the necessary information for extracting and processing the MPDU. For example, this information may include the length of MPDU payload, the particular RX PHY queue 338 to extract the MPDU, the method of encryption/decryption, and any other suitable information. In one particular embodiment, the MPDU header sent to MAC processors 310 may indicate that the MPDU header is followed by subheaders. In this scenario, the RX descriptor generated by MAC processors 310 may instruct RX module 326 not to decrypt/encrypt the additional bytes of the subheaders, such that only the MPDU payload is encrypted/decrypted. As a result of the PHY 330 being word aligned, alignment issues may occur when an MPDU is extracted from a RX PHY queue 338 that ends on the same word line that also includes data associated with the next MPDU in the RX PHY queue 338. Alignment issues are described in more detail below in FIGS. 13a and 13b.

After an MPDU payload is processed, RX module 326 may append the MPDU header to the processed MPDU payload. RX module 326 may utilize the RX DMA 808 to store this data in a contiguous location in system memory 312. While RX DMA 808 is sending the processed MPDU to system memory 312, RSE 800 may read the next RX descriptor from RX descriptor FIFO 807, and RSE 800 may begin to process the next identified MPDU. This process may continue until RX descriptor FIFO 807 is empty. When RX descriptor FIFO 807 is empty, RX module 326 may begin to scan the RX PHY queues 338 again to extract data from the RX PHY queues 338 that are not empty.

The architecture of controller 300 allows RX module 326 to forward the headers and other data to the MAC processors 310 for parsing the header and providing a RX descriptor to RX module 326. As a result, RX module 326 can focus on processing MPDUs, which allows base station 30 to process received MPDUs much faster. Such functionality may provide flexibility for scheduling concurrent bursts.

A further advantage of the architecture of controller 300 of base station 30 allows the MPC 320 to remain unchanged even if the current standards change. RX module 326 can still be used without modification even if the standards change because MAC processors 310 rather than MPC 320 are providing the instructions of how to process the bursts and their associated MPDUs. If the standards change the functionality of a burst, then the operators of base station may only need to provide new software for MAC processors 310 rather than replacing the MPC 320. Thus, operators of base station 30 may save money by utilizing the architecture of controller 300.

Figure 9:
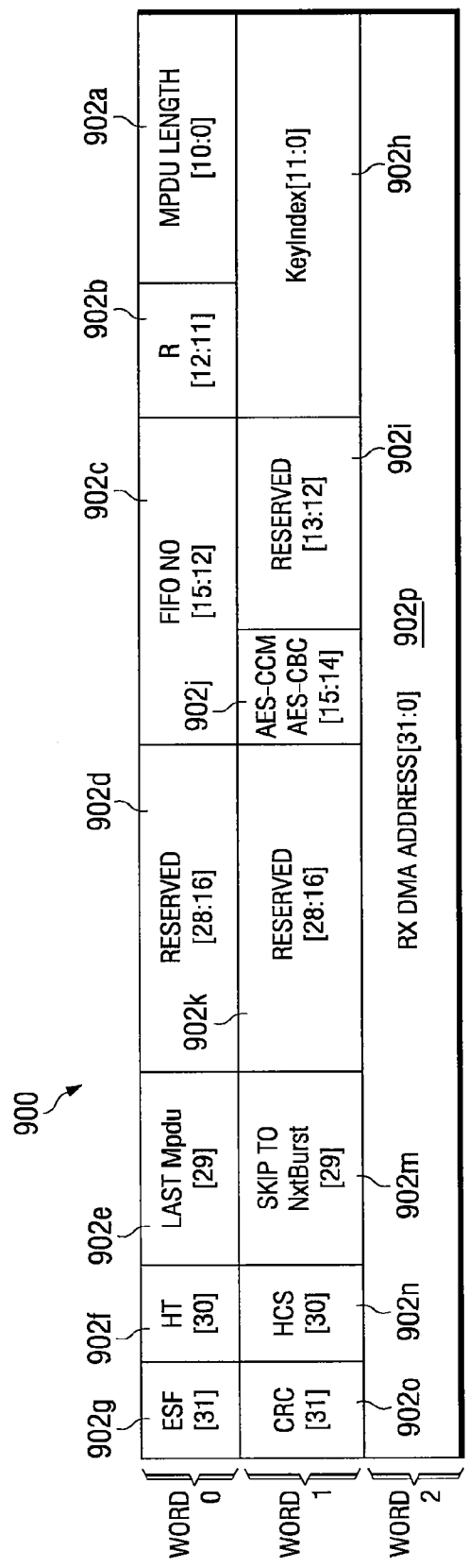
FIG. 9 is a simplified block diagram of an example reception MPDU descriptor in accordance with a particular embodiment.

FIG. 9 is a simplified block diagram of an example reception descriptor 900 in accordance with a particular embodiment. In the illustrated embodiment, RX descriptor 900 comprises three words (words zero, one and, two) and has various descriptor fields 902 that specify information for processing an MPDU. Word zero of RX descriptor 900 may be thirty-two bits including descriptor fields 902a-902g. Descriptor field 902a specifies the MPDU length in bytes and the length may also include the MPDU header as well as any CRC and extended subheaders. Descriptor field 902b may be reserved for future functionality. Descriptor field 902c specifies the address of the RX PHY queue 338 (for example, a FIFO queue) from which the burst and its associated MPDU is to be extracted. Descriptor field 902d may be reserved for future functionality. Descriptor field 902e specifies whether the MPDU is the last MPDU in the burst. Descriptor field 902f may indicate whether the MPDU header is a signaling header or a generic MAC header. Descriptor field 902g may indicate whether the MPDU is to have an extended subheader. In this scenario, RSE 800 may not decrypt/encrypt the additional bytes of the extended header, such that only the MPDU payload is encrypted/decrypted.

Word one of RX descriptor may be thirty-two bits including descriptor fields 902h-902o. Descriptor field 902h specifies a key index number which indicates the key to be used from key table 420. Descriptor field 902i may be reserved for future functionality. Descriptor field 902j specifies whether AES-CCM or AES-CBC decryption should be used for processing the MPDU. Descriptor field 902j for AES is less bits in RX descriptor than transmission descriptor because only the TX module 322 utilizes the special encryption modes as specified in transmission descriptor field 602k and described in FIG. 11. Descriptor field 902k may be reserved for future functionality. Descriptor field 902m indicates if RSE 800 should skip to next burst if HCS check failed. Descriptor field 902o indicates whether a CRC is to be performed. Descriptor field 902n specifies whether HCS is enabled.

Word two of RX descriptor may include descriptor field 902p which provides the RX DMA start address. RX DMA start address may be a word aligned address that provides the location in system memory 312 to write the processed MPDU. While specific fields 902 for RX descriptor 900 have been provided, RX descriptor 900 may have any number of fields 902. Additionally, fields 902 may be rearranged and interleaved to reserve bits for additional fields 902.

Figure 10:
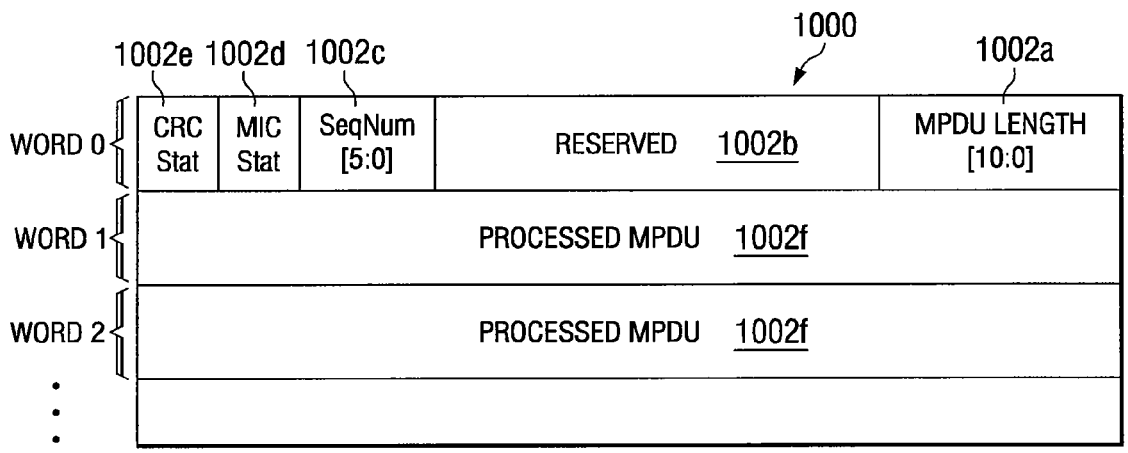
FIG. 10 is a simplified block diagram of an example processed MPDU in accordance with a particular embodiment.

FIG. 10 is a simplified block diagram of an example processed MPDU in accordance with a particular embodiment. In the illustrated embodiment, processed MPDU 1000 may be stored in system memory 312 with the various fields 1002 that specify information associated with the processed MPDU 1002. Word zero of processed MPDU 1000 may be thirty-two bits including fields 1002a-1002e. Word zero of processed MPDU 1000 may be stored at the RX DMA address 902p as described in FIG. 9. Field 1002a specifies the MPDU length in bytes. The length of MPDU may include the MPDU header as well as any CRC and extended subheaders. Field 1002b may be reserved for future functionality. Field 1002c specifies the sequence number of the burst associated with the processed MPDU 1000. Field 1002d indicates the MIC status. Field 1002e indicates the CRC status.

Field 1002f is the processed MPDU which may span across one or more words. Processed MPDU may include the unencrypted MPDU header with the decrypted/encrypted MPDU payload. While specific fields 1002 for the processed MPDU 1000 have been provided, the processed MPDU 1000 may have any number of fields 1002. Additionally, fields 1002 may be rearranged and interleaved to reserve bits for additional fields 1002.

Figure 11:
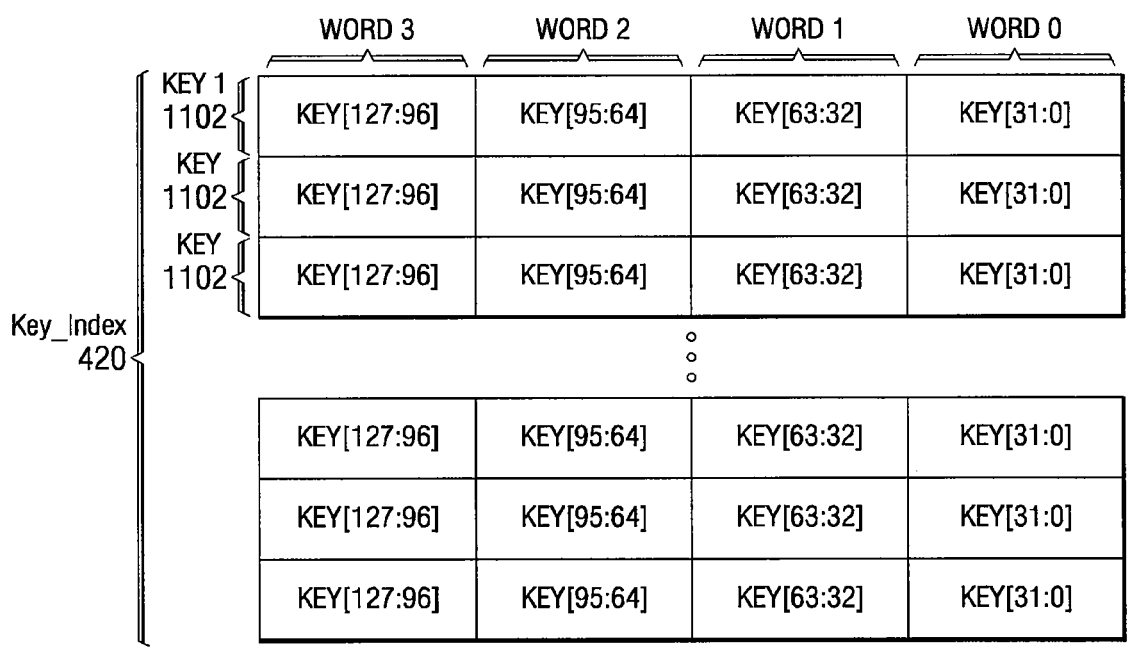
FIG. 11 is a simplified block diagram of an example key table in accordance with a particular embodiment.

FIG. 11 is a simplified block diagram of an example key table 420 in accordance with a particular embodiment. MPC 320 may include key table 420 that includes the keys stored for AES encryptions/decryptions. As a result of key table 420 being stored in MPC rather than system memory 312, no additional bus traffic is created on controller. In one particular embodiment, key table 420 may be located on MPC control bypass 324. As a result, key table 420 may be shared between TX module 322 and RX module 326. In this particular embodiment, key table 420 may be implemented with 1W-2R memory. In one particular embodiment, MAC processors 310 may write to key table 420 even when MPC 320 is in power saving mode.

MPC 320 may have a limited memory size so operator of base station 30 may need to configure a fixed number of keys corresponding to a fixed number of users supported by base station 30. In one particular embodiment, key table 420 may store keys for two hundred users. In one particular embodiment, each key may be sixteen bytes in Big Endian Order. In one particular embodiment, key table may be 20,480 bytes. If base station 30 supports keys for two hundred users and each key is sixteen bytes, then the keys for two hundred users may require 19,200 bytes. This leaves 1,280 bytes in key table 420 for CMAC keys and authentication keys.

In one particular embodiment, MPC 320 may support five encryption/decryption algorithm modes requiring the AES engine and a key from the key table 420. The five algorithm modes may include CMAC downlink, CMAC uplink, DOT16KDF, plain AES encryption/decryption, and AES-CBC encryption/decryption. TX module 322 may include one or more registers that store the AES results of the encryption/decryption algorithms in Big Endian Order. MPC 320 may provide the AES results to MAC processors 310.

CMAC downlink is an algorithm mode that may be used by MPC 320 for encryption and decryption of the MPDUs by utilizing the AES as described with respect to FIG. 6. CMAC uplink is another algorithm mode used by MPC 320 for encryption and decryption MPDUs by utilizing the AES engine as described below in FIG. 12.

DOT16KDF is another algorithm mode that may be used by MPC 320 to generate keys utilizing the AES engine. The underlying algorithm in Dot16KDF is CMAC. For example, MAC processors 310 may write a transmission descriptor that sets the AES mode to DOT16KDF, provides the key index where an authentication key is stored, and sets the MPDU length to 384, which indicates the length of the Dot16KDF key output. In one embodiment, authentication key may be truncated from 160 bits to 128 bits. The result of DOT16KDF algorithm may be provided to MAC processors 310 through AES registers. MAC processors 310 may read the results from the AES registers when TX module 322 has completed the calculation.

In an alternative embodiment, MAC processors 310 may be used to calculate the Dot16KDF key output instead of TX module 322. MAC processors 310 may write different CMAC descriptors, such that multiple CMACs run in a loop and the final result is a Dot16KDF key. For example, MAC processors 310 may write ten CMAC descriptors, instruct MPC 320 to run CMAC with the ten different CMAC descriptors, and after the final iteration of the last CMAC descriptor, MAC processors 310 may receive the Dot16KDF result.

Plain AES is another algorithm mode that may be used by MPC 320 for encryption and decryption utilizing the AES engine. MAC processors 310 may use Plain AES mode to encrypt the transmission encryption key using the key encryption key. There may be many AES functions, such as AES keywrap, that may utilize plain AES mode to process data. MPC 320 may store the results in AES registers. For example, MAC processors 310 may write a transmission descriptor with the AES mode set to Plain AES mode, provide the key index in key table 420, and set the MPDU length anywhere between one to 384 bytes. In one particular embodiment, MPC 320 may pad the bytes in case it does not make a 16 byte block size.

Figure 12:
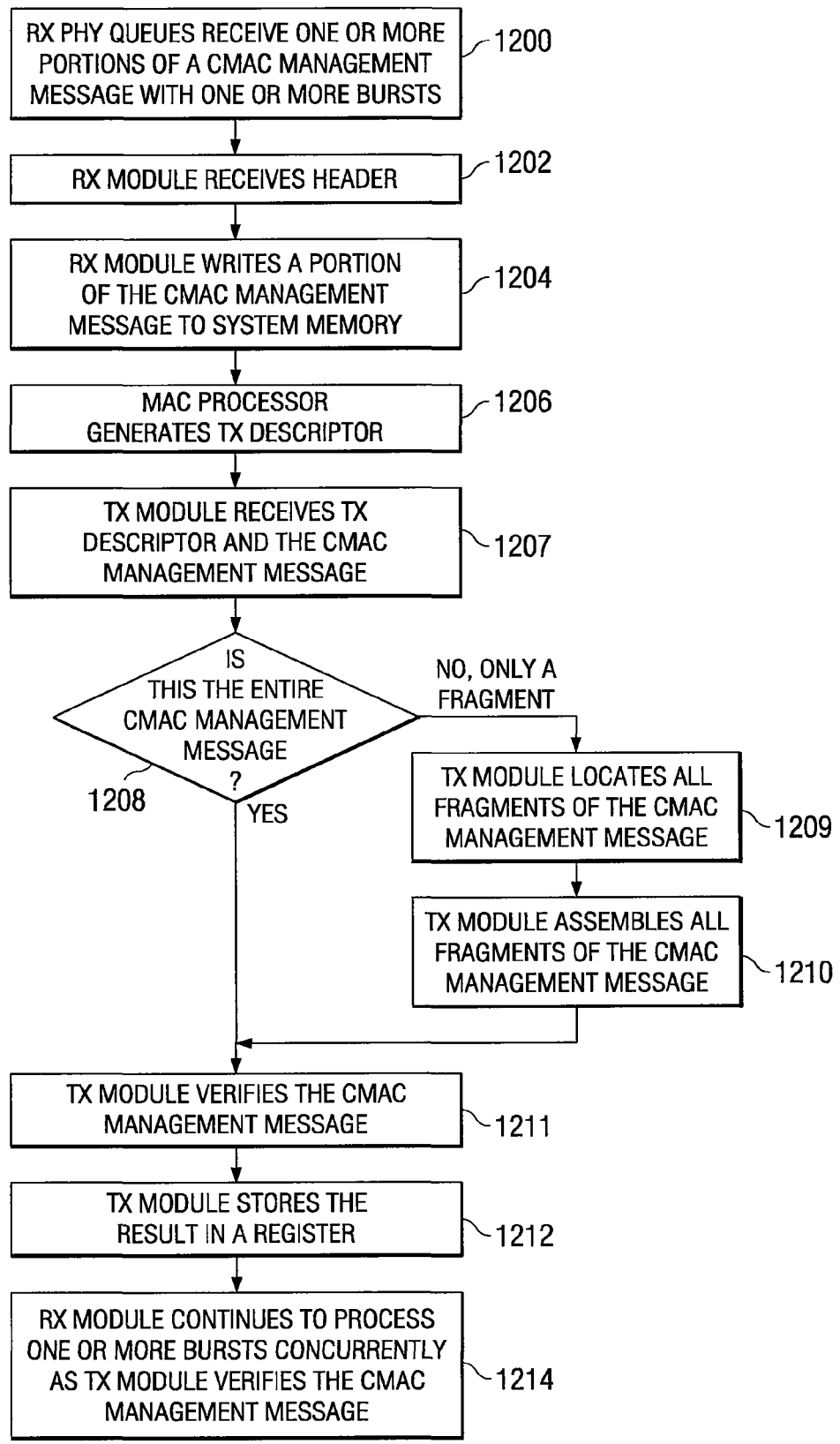
FIG. 12 is a flow chart illustrating an example operation of a MAC physical layer (PHY) coprocessor (MPC) processing a management message in uplink mode.

FIG. 12 is a flow chart illustrating an example operation of the MPC 320 processing a management message in uplink mode. The flowchart may begin at step 1200 when one or more RX PHY queues 338 receive one or more portions of a CMAC uplink message with one or more bursts. A CMAC uplink message may be a management message that contains a message authentication code key used to validate the authenticity of the MAC management message. Management message may be spread across one or more received bursts and one or more MPDUs. For example, one burst may contain a portion of management message and another burst may contain another portion of management message. As a result, management message may be spread across multiple RX PHY queues 338.

At step 1202, RX module receives MPDU header. MPDU header may indicate if it is a management message or a normal message so that MPC 320 knows when to use TX module 322 to handle processing a management message for CMAC uplink mode.

At step 1204, RX module 326 may write a portion of the management message to system memory. At step 1206, MAC processors 310 may generate a TX descriptor based on the MPDU header from CMAC uplink messages. At step 1207, TX module 322 may receive the TX descriptor, such that the TX descriptor indicates that the encryption mode is CMAC uplink mode. TX module 322 may also the CMAC management message. At step 1208, TX module 322 determines if it has received the entire CMAC management message. If TX module 322 has received the entire CMAC management message, then TX module continues processing at step 1211. If TX module has only received a fragment of the entire CMAC management message, then TX module continues processing at step 1209.

At step 1209, after RX module 326 has processed an entire burst from one of the RX PHY queues 338, MAC processors 310 may know where the fragmented portions of the management message are located. As described in conjunction with FIG. 7 for processing in CMAC downlink mode, TX module 322 may similarly chain multiple fragments of management message to locate all fragments of management message in CMAC uplink mode. At step 1210, TX module 322 may also assemble the fragments of the CMAC management message.

At step 1211, TX module 322 may run CMAC on management message to verify the received CMAC management message. MPC 320 uses TX module 322 to process the management message comprising the fragmented portions received from the multiple RX PHY queues 338. While in CMAC uplink mode, MPC 320 utilizes TX module 322 for RX functionality so that TX module 322 and RX module 326 may be used concurrently to efficiently process management messages from received bursts. It is not critical for controller 300 to process the management message immediately because the entire management message may not be received until several bursts are processed.

At step 1212, TX module 322 may compare the calculated CMAC with the received CMAC management message and save the results in an AES register.

At step 1214, during CMAC uplink mode, RX module 326 may continue to process received bursts and their associated MPDUs from the RX PHY queues 338 as usual as described in conjunction with FIG. 8. TX module 322 and RX module 326 may be utilized concurrently so that controller 300 of base station 30 can process received bursts like normal and simultaneously perform processing for CMAC uplink mode. Thus, architecture of controller 300 of base station 30 allows MPC 320 to process bursts faster.

Figure 13A:
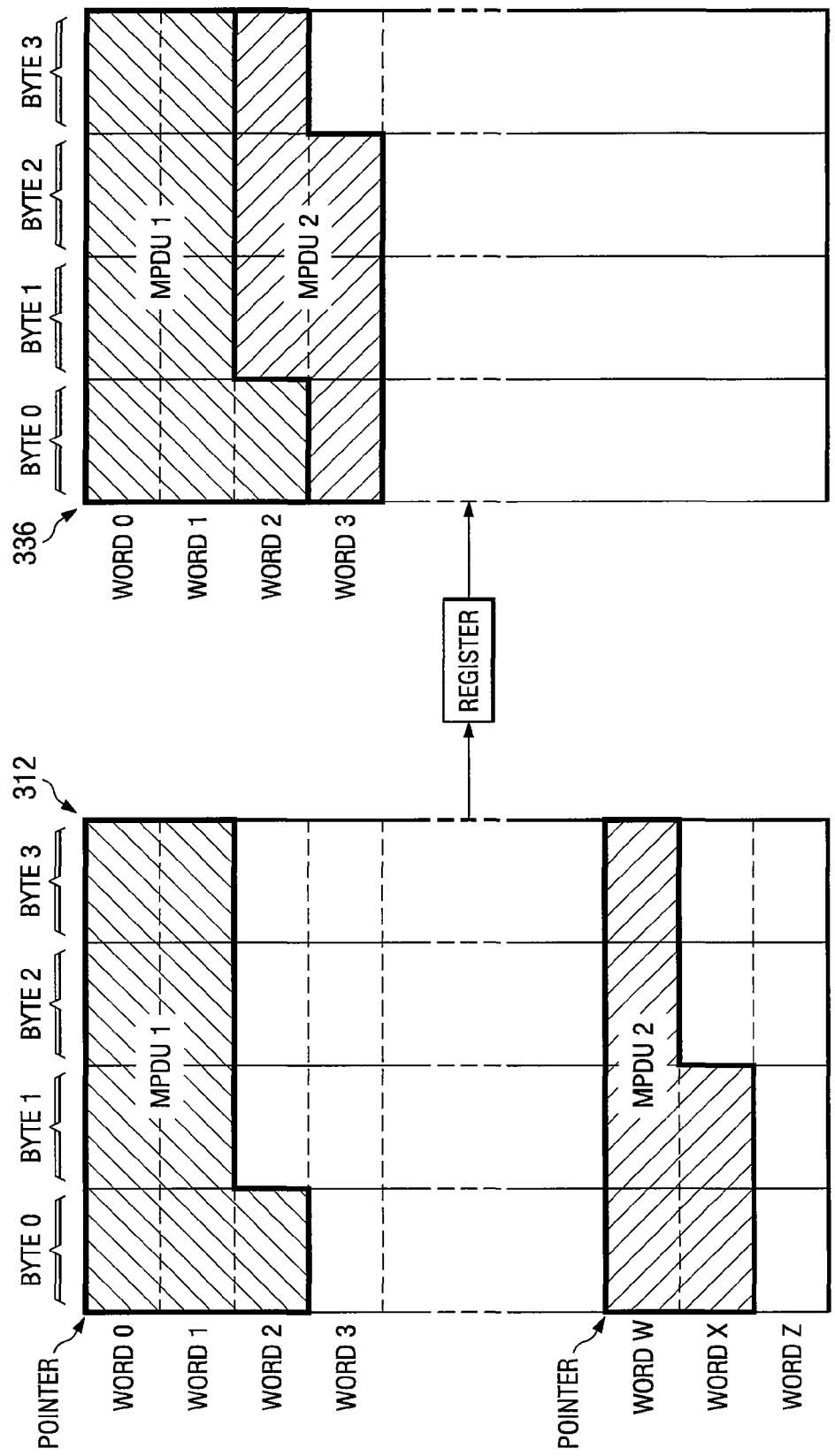
FIG. 13A is a simplified block diagram illustrating an example operation of the MPC receiving an MPDU from system memory and aligning the MPDU in a transmission PHY queue in accordance with a particular embodiment.

FIG. 13A is a simplified block diagram illustrating an example operation of the MPC 320 receiving an MPDU from system memory 312 and aligning the MPDU in a transmission PHY queue 336 in accordance with a particular embodiment. As mentioned, PHY 330 may only deal with data bursts and thus may only communicate data in word segments. Many MPDUs are included in a burst. Because MPDUs are byte aligned, alignment issues arise when a particular MPDU ends on a byte that is not a word aligned boundary. Rather than requiring the MAC processors 310 to handle alignment issues, MPC 320 may handle the alignment issues caused by MPDUs not being word aligned for storage in TX PHY queues 336. This example operation is explained below in more detail at FIG. 14A.

FIG. 13B is a simplified block diagram illustrating an example operation of the MPC 320 receiving an MPDU from a RX PHY queue 338 and aligning the MPDU in system memory 312 in accordance with a particular embodiment. This example operation is explained below in more detail at FIG. 14B.

Figure 14A:
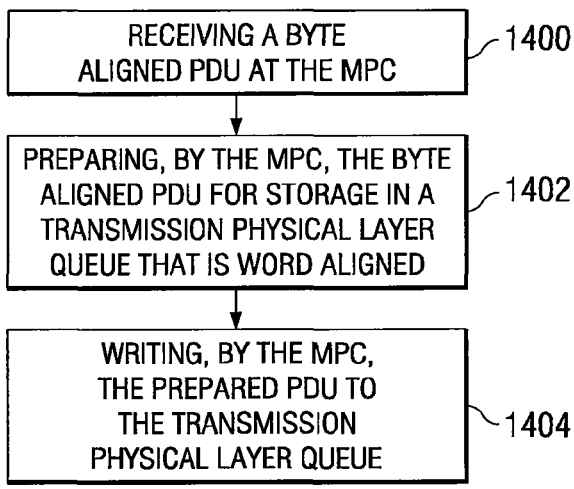
FIG. 14A is a flow chart illustrating an example operation of the MPC receiving an MPDU from system memory and aligning the MPDU in a transmission PHY queue in accordance with a particular embodiment.

FIG. 14A is a flow chart illustrating an example operation of the MPC 320 receiving an MPDU from system memory 312 and aligning the MPDU in a TX PHY queue 336 in accordance with a particular embodiment. The flow chart may begin at step 1400 when MPC 320 may receive one or more byte aligned MPDUs.

At step 1402, MPC 320 may prepare one or more byte aligned PDUs for storage in a TX PHY queue that is word aligned. For example, MPC may write a first processed MPDU to a particular TX PHY queue 336, such that the stored MPDU ends on a byte that is not on a word aligned boundary. Thus as illustrated in FIG. 13A, byte 0 of word 2 in TX PHY queue 336 may store the last byte of the first MPDU. Thus, word 2 in TX PHY queue 336 has three remaining bytes of free memory. As mentioned, PHY 330 can only be written to with data in word segments so those three remaining bytes will not be used if the second MPDU is written to the next word of TX PHY queue 336. Efficient use of memory of a TX PHY queue 336 may require an alignment process to utilize those three remaining bytes for storing the first three bytes of the second MPDU.

For example, a first TX descriptor may indicate the location in system memory 312 and the length of the first MPDU so MPC 320 may know the number of bytes of the first MPDU to write to a particular TX PHY queue 336. MPC 320 may determine if the first MPDU ends with a byte that is not word aligned. Because the first MPDU does not end on a word aligned boundary, MPDU may utilize any suitable method to keep track of the one or more bytes stored in the last word of the TX PHY queue 336 associated with the first MPDU. At step 1404, as illustrated in FIG. 13A, MPC 320 may write byte 0 of word 2 of the particular TX PHY queue 336 to a register and MPC 320 may remember that byte 0 of word 2 is associated with the first MPDU.

For example, a second TX descriptor indicates the location in system memory 312 and the length of a second MPDU associated with the same burst as the first MPDU. As mentioned, MPC 320 is aware of the alignment issue of word 2 of the particular TX PHY queue 336. To properly align the MPDUs in the TX PHY queue 336, MPC 320 may append the first three bytes from the second MPDU to the remaining byte stored in the register associated with the first MPDU so that a word comprising the four bytes is formed.

At step 1404, as illustrated in FIG. 13A, MPC 320 may write this word to word 2 of the particular TX PHY queue 336, such that byte 0 is associated with the last byte of the first MPDU and bytes 1, 2, and 3 are the first three bytes of the second MPDU. Thus, all bytes of TX PHY queue 336 are utilized even though the MPDUs are not word aligned.

In one embodiment, MPC 320 may utilize pointers or any other suitable mechanism to retrieve the remaining bytes of the second MPDU by retrieving four consecutively stored bytes from system memory 312 that are associated with the second MPDU, such that the start address of the remainder of the second MPDU is the system memory address of the first byte that has not been written to the TX PHY queue 336.

Figure 14B:
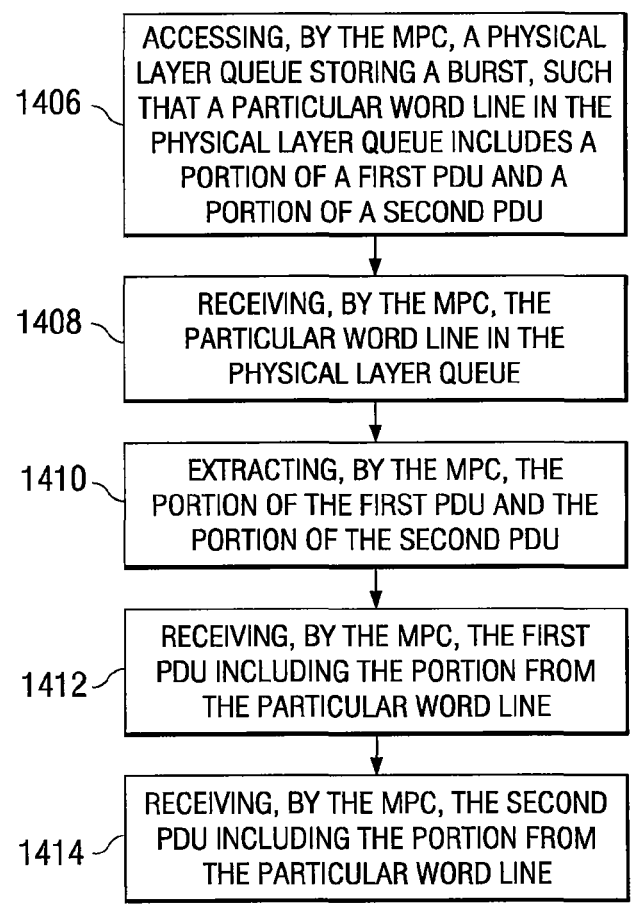
FIG. 14B is a flow chart illustrating an example operation of the MPC receiving an MPDU from a reception PHY queue and aligning the MPDU in system memory in accordance with a particular embodiment.

FIG. 14B is a flow chart illustrating an example operation of the MPC 320 receiving an MPDU from a RX PHY queue 338 and aligning the MPDU in system memory 312 in accordance with a particular embodiment. The flow chart may begin at step 1406 when MPC 320 accesses a particular RX PHY 338 queue storing a burst, such that the particular word line in a particular RX PHY 338 queue includes a portion of a first MPDU and a portion of a second MPDU.

At step 1408, MPC 320 may receive the particular word line in the RX PHY queue 338 that includes the portion of the first MPDU and the portion of the second PDU when MPC 320 receives the first MPDU to process. For example, when a particular RX descriptor is processed by RSE 800, the first MPDU with a length identified by the RX descriptor can be extracted from a particular RX PHY queue 338 identified by the RX descriptor. As mentioned, the MPDU may be extracted out in word segments because PHY 330 may have word aligned boundaries. As mentioned, RX descriptor indicates to RX module 326 where a particular MPDU ends based on the length of the MPDU. MPDUs are byte aligned so RX module 326 may be responsible for handling the byte alignment issues when an MPDU ends on a non-word aligned boundary. If a particular MPDU currently being processed by RX module 326 ends at a byte that is not word aligned in the RX PHY queue 338, then RX module 326 may extract the entire word including the remaining bytes associated with the second MPDU stored in the RX PHY queue 338.

At step 1410, MPC 320 may use any suitable method to separate the portion of the first MPDU from the portion of the second MPDU in that particular word line. In one embodiment, MPC 320 may extract the portion of the first MPDU and store it in an internal register 810 and extract the portion of the second MPDU and store it in another internal register 810.

At step 1412, MPC 320 may receive the first MPDU including the portion from the particular word line and process the first MPDU with the RX module 326. In a particular embodiment, RX module 326 may utilize pointers or any other suitable mechanism to process MPDUs with alignment issues. In a particular embodiment, RX module 326 may write zeros over the extracted portion of the word segment that is not associated with the MPDU currently being processed so that the RX module 326 only processes bytes associated with the current MPDU.

At step 1414, MPC 320 may receive the second PDU including the portion from the particular word line and process the second MPDU with the RX module 326. When an alignment issue occurs when MPC 320 is processing a first MPDU, MPC 320 may use the data stored in the particular internal register 810 to properly receive and process the second MPDU including the portion stored in that particular RX PHY queue 338. For example, RX module 326 can properly extract an upcoming MPDU header or sequence number even if a portion of the upcoming header or sequence number is stored separately from the RX PHY queue 338 in an internal register 810 corresponding to that RX PHY queue 338.

Although the present disclosure has been described in detail with reference to particular embodiments, mobile wireless environment 10 may be extended to any scenario in which a base station utilizes an MPC. In addition, some elements may be provided as separate external components to mobile wireless environment 10 where appropriate. The present disclosure contemplates great flexibility in the arrangement of these elements as well as their internal components. Moreover, although FIGS. 1-14B illustrate an arrangement of selected elements, numerous other components and algorithms may be used in combination with these elements or substituted for these elements without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method for processing one or more bursts, comprising:
receiving at least a portion of a first protocol data unit (PDU) into a physical-layer queue, the PDU comprising a header;
communicating the header of the PDU to a media access control (MAC) processor;
generating, at the MAC processor, a descriptor for the PDU, the descriptor comprising one or more fields, the descriptor comprising instructions regarding how to process the PDU;
communicating the descriptor to a reception (RX) module logically residing between a physical layer controller (PHY) and the MAC processor; and processing, at the RX module, the PDU according to the instructions of the descriptor.

2. The method of claim 1, wherein processing the PDU comprises performing a cyclic redundancy check.

3. The method of claim 1, further comprising writing the processed PDU to system memory.

4. The method of claim 3, wherein the system memory is a double data rate two (DDR2) synchronous dynamic random access memory (SRAM).

5. The method of claim 1, wherein a first field of the descriptor identifies the length of the PDU.

6. The method of claim 1, further comprising:
   receiving at least a portion of a second PDU into a second physical-layer queue at the same time as receiving at least the portion of the first PDU into the physical-layer queue, the second PDU comprising a second header; and
   communicating the second header of the PDU to the MAC processor at the same time as communicating the first header to the MAC processor.

7. An apparatus for processing one or more bursts, comprising:
   a physical-layer queue configured to receive at least a portion of a first protocol data unit (PDU), the PDU comprising a header;
   a media access control (MAC) processor configured to receive the header of the PDU and generate a descriptor for the PDU, the descriptor comprising one or more fields, the descriptor comprising instructions regarding how to process the PDU; and
   a reception (RX) module configured to receive the descriptor module and process the PDU according to the instructions of the descriptor, the RX module logically residing between a physical layer controller (PHY) and the MAC processor.

8. The apparatus of claim 7, wherein the RX module is configured to perform a cyclic redundancy check on the PDU according to the descriptor.

9. The apparatus of claim 7, wherein a RX direct memory access (DMA) is configured to write the processed PDU to system memory.

10. The apparatus of claim 9, wherein the system memory is a double data rate two (DDR2) synchronous dynamic random access memory (SRAM).

11. The apparatus of claim 7, wherein a first field of the descriptor identifies the length of the PDU.

12. The apparatus of claim 7, further comprising:
   a second physical layer-queue configured to receive at least a portion of a second PDU into at the same time as the first physical layer-queue is receiving at least the portion of the first PDU, the second PDU comprising a second header; and
   the MAC processor, configured to receive the second header of the second PDU at the same time as receiving the first header to the MAC.

* * * * *